(12) United States Patent
Bonanno et al.

(10) Patent No.: US 10,481,912 B2
(45) Date of Patent: Nov. 19, 2019

(54) VARIABLE BRANCH TARGET BUFFER (BTB) LINE SIZE FOR COMPRESSION

(71) Applicant: International Business Machines Corporation, Armonk, NY (US)

(72) Inventors: James J. Bonanno, Wappingers Falls, NY (US); Michael J. Cadigan, Jr., Poughkeepsie, NY (US); Brian R. Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 297 days.

(21) Appl. No.: 15/191,783

(22) Filed: Jun. 24, 2016

(65) Prior Publication Data

US 2017/0371668 A1    Dec. 28, 2017

(51) Int. Cl.
  *G06F 9/30* (2018.01)
  *G06F 9/38* (2018.01)
(52) U.S. Cl.
  CPC ........ *G06F 9/3806* (2013.01); *G06F 9/30058* (2013.01)
(58) Field of Classification Search
  CPC ................ G06F 9/3806; G06F 9/30058
  See application file for complete search history.

(56) References Cited

U.S. PATENT DOCUMENTS

| 5,774,710 | A | 6/1998 | Chung | |
|---|---|---|---|---|
| 6,115,134 | A * | 9/2000 | Creel | G06K 15/02 358/1.16 |
| 6,460,116 | B1 | 10/2002 | Mahalingaiah | |
| 7,120,784 | B2 * | 10/2006 | Alexander | G06F 9/30181 712/240 |
| 7,676,663 | B2 * | 3/2010 | Prasky | G06F 9/325 712/238 |
| 7,707,397 | B2 | 4/2010 | Henry et al. | |
| 2015/0019848 | A1 | 1/2015 | Bonanno et al. | |
| 2015/0301829 | A1 * | 10/2015 | Scott | G06F 9/3806 712/238 |

* cited by examiner

*Primary Examiner* — Aimee Li
*Assistant Examiner* — Kasim Alli
(74) *Attorney, Agent, or Firm* — Cantor Colburn LLP; William Kinnaman

(57) ABSTRACT

Embodiments include method, systems and computer program products for variable branch target buffer line size for compression. In some embodiments, a branch target buffer (BTB) congruence class for a line of a first parent array of a BTB may be determined. A threshold indicative of a maximum number branches to be stored in the line may be set. A branch may be received to store in the line of the first parent array. A determination may be made that storing the branch in the line would exceed the threshold and the line can be responsively split into an even half line and an odd half line.

14 Claims, 4 Drawing Sheets

VARIABLE BRANCH TARGET BUFFER (BTB) LINE SIZE FOR COMPRESSION

BACKGROUND

The present disclosure relates to computer processing systems, and more specifically, to methods, systems and computer program products for variable branch target buffer (BTB) line size for compression.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset from the branch address or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction.

SUMMARY

In accordance with an embodiment, a system for variable branch target buffer (BTB) line size for compression is provided. The system may include a branch target buffer (BTB); and a processing circuit coupled to the branch target buffer. The processing circuit may be configured to perform a method that includes determining a BTB congruence class for a line of a first parent array of the BTB; setting a threshold indicative of a maximum number branches to be stored in the line; receiving a branch to store in the line of the first parent array; determining that storing the branch in the line would exceed the threshold; and splitting the line into an even half line and an odd half line, wherein one of the even half line or the odd half line is stored in a second parent array of the BTB, and wherein the branch is associated with the second parent array based on an address of a branching mapping to either the even half line or the odd half line.

In another embodiment, a computer-implemented method may include determining a branch target buffer (BTB) congruence class for a line of a first parent array of a BTB; setting a threshold indicative of a maximum number branches to be stored in the line; receiving a branch to store in the line of the first parent array; determining that storing the branch in the line would exceed the threshold; and splitting the line into an even half line and an odd half line, wherein one of the even half line or the odd half line is stored in a second parent array of the BTB, and wherein the branch is associated with the second parent array based on an address of a branching mapping to either the even half line or the odd half line.

In another embodiment, a computer program product may include a tangible storage medium readable by a processing circuit and storing instructions for execution by the processing circuit for performing a method. The method may include determining a branch target buffer (BTB) congruence class for a line of a first parent array of a BTB; setting a threshold indicative of a maximum number branches to be stored in the line; receiving a branch to store in the line of the first parent array; determining that storing the branch in the line would exceed the threshold; and splitting the line into an even half line and an odd half line, wherein one of the even half line or the odd half line is stored in a second parent array of the BTB, and wherein the branch is associated with the second parent array based on an address of a branching mapping to either the even half line or the odd half line.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

Figure 1:
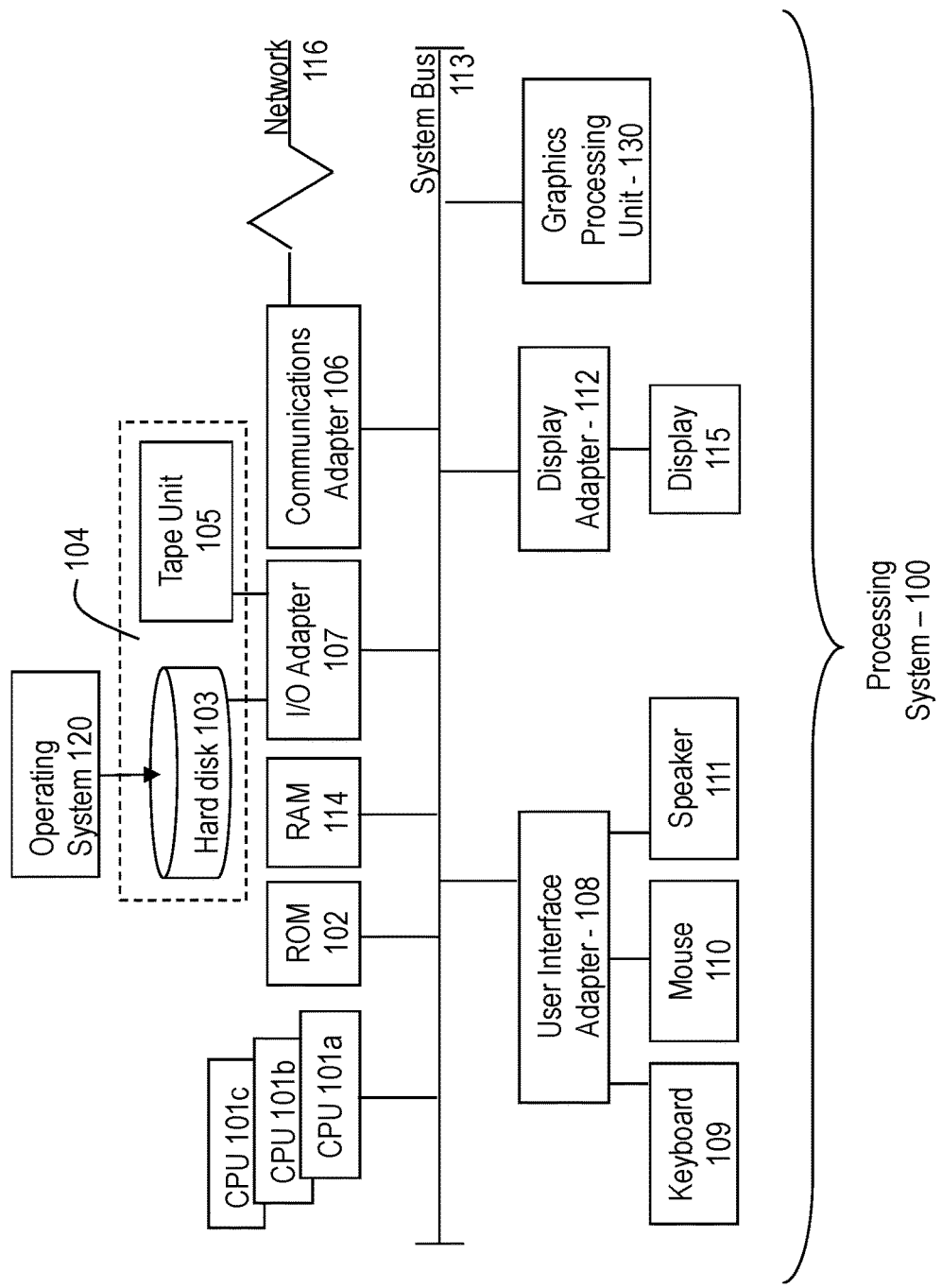
FIG. 1 is a block diagram illustrating one example of a processing system for practice of the teachings herein.

In accordance with exemplary embodiments of the disclosure, methods, systems and computer program products for variable branch target buffer (BTB) line size for compression are provided. The methods and systems described herein are directed to a hierarchical BTB with variable BTB line size. The hierarchical BTB may include two levels of associativity along with a BTB congruence class. When a parent array of the BTB acquires a branch which exceeds the capacity of the line of the parent array, the line size may be divided by two and a new or second parent array may be allocated. For example, a branch congruence class for a 128-byte line for a parent array. A specified number of branches may be stored within the 128-byte line. Multiple parent arrays, each four way set associative, may be allowed in order to define an eight way set associative parent design. If there are additional branches within the 128-byte line, the line may be split into even and odd 64-byte lines and each of the lines may be stored in different parent arrays. An aggregate of eight branches may be stored within the 128-byte line.

In some embodiments, a branch predictor may include a branch target buffer (BTB) structure and a number of structures and buffers to support branch prediction and branch target prediction. In one design implementation known as asynchronous branch prediction, the BTB may be searched in parallel to and independently from instruction fetching to find upcoming branches. In synchronous branch prediction, the BTB may be accessed simultaneously with or after fetching instructions and determining instruction boundaries in order to provide a prediction for each encountered branch instruction. In either design implementation, performance benefits of the BTB are a function of the accuracy of the prediction provided from the BTB, a function of the capacity of the BTB, and the latency required to access the BTB.

A larger BTB may provide better prediction accuracy than a smaller BTB because it may store information about more branch instructions; however, a larger BTB typically has a longer latency than a smaller BTB. A large BTB may be implemented with one or more large static random access memory (SRAM) arrays or eDRAM (for greater density over SRAM). Such large SRAM arrays may have a limited number of read and write ports (e.g., only 1 or 2) and have restrictions such that it may not be possible to both read and write to the same bank of the SRAM array in the same cycle. A small BTB may be implemented with one or more small SRAM register files. SRAM register files may be more flexible in providing multiple read and write ports. However, multi-ported register files may be less dense than SRAM arrays, making multi-ported register files infeasible to implement a sufficiently large BTB to provide adequate performance, especially in commercial workloads with large instruction (and therefore branch) footprints.

In some embodiments, a BTB structure may include multiple levels, such as a first level BTB (BTB1), a slower but larger second-level BTB (BTB2), and a faster but smaller branch target buffer preload table (BTBP). The BTBP may be a small BTB that is searched in parallel with a larger main BTB (BTB1) to predict branch instructions' targets, and optionally direction. The BTB2 may be larger (and potentially slower) than the BTB1. Because the BTB1 and BTB2 are large, they may be implemented with large SRAM arrays which have a limited number of read and write ports. However, since the BTBP may be smaller than the BTB1, it may be implemented with SRAM register files. The BTBP may have many read and write ports that may be used simultaneously. In some embodiments, the BTBP, at the cost of decreasing branch prediction efficiency, may be omitted as an intermediate structure between the BTB1 and the BTB2.

In some embodiments, hierarchical BTB may have a goal to store the branches in the BTB2 (and beyond) in as little space as possible for each branch. Through compacting as many branches as possible in an associated tag for a region of address space, greater efficiency may be achieved. For the BTB1, advantages may include more efficient use of storage and a more efficient search rate measured in line size, branches, code region searched per cycle, power, and/or install rate from the BTB2. For the BTB2, advantages may include an increased capacity per unit of area and a more efficient transfer rate back to the BTB1.

In designing a BTB, the amount of branches that can be stored in the BTB is part of the equation that determines how beneficial the BTB structure is. In general, a BTB is indexed by part of an instruction address within the processor, and tag bits are stored in the BTB such that the more significant tag bits must match the remaining address bits of concern, that is, address bits, that were not used for the indexing. In order to improve the efficiency of the BTB, the BTB can be created such that it has an associativity greater than one. By creating an associativity greater than one, multiple branch/target pairs can be stored for a given index into the array. To determine which is the correct entry, if an entry at all, the tag bits are used to select one, at most, entries from the multiple entries stored for a given index.

For example, if the line size is 128 bytes, then the index bits could be as large as 0:56, given 0 is the most significant bit. This table would be so large as to be un-buildable. As such, indexing may only be 47:56 (e.g., to create a 1 k deep table). The tag could be 0:46 or, for efficiency, a smaller tag such as 32:46. A smaller tag would yield aliasing that may create a false prediction.

There are also tag bits 57:63 denoted with each branch in the BTB. These are to distinguish it from other branches within the line. In the case of starting at searching for a branch at point Y within the line, the taken branch of interest is either at or after the Y offset within the line. In other words, the tag 32:46 must match. However the tag of 57:63 is not necessarily a direct match when searching, for example, the first taken branch within a line.

With respect to the branch target, the branch target may be located close to the branch, possibly the branch itself, or somewhere far away from the address of the branch. The closer a branch is to its target, the more likely it is for a branch address tag and a target address to have equal address bits throughout some portion of the higher address bits. This is because programs, while being potentially very large in size, use a divide and conquer method in the way they are written. Different sections of code may be used for different operations of a program. Within the smaller segments there are many relatively local branches and there exist few branches that go between the different segments of the program. Within the smaller segments, branch and target addresses are more likely to be close together and therefore have more bits in common than those branches which branch further distances. According to the systems and methods described herein, this locality of reference may be exploited to engineer the associativity of a BTB such that associativity becomes dynamic in nature.

By creating a dynamic associative BTB, there can be a maximum of 'X' entries per line given that the branch to target mappings have many bits in common. When the bits are common in nature, they do not need to be stored for both the branch and the target, but rather only once for a branch/target combination. When there are additional distinct bits between a branch/target pair, then one of the dynamic entries that was to hold a branch/target pair, can now be used to create a larger single entry such that there can be additional distinct bits between that of a branch and a target. This reduces the associativity for a given line below 'X'; which leads to an overall win. By defining a mapping pattern of such nature, for a given number of bits for a BTB, then the total number of entries that can be stored in a table is greater in a dynamic BTB over that of the static BTB. Likewise, for a total number of required entries, the dynamic BTB will require less total table bits to implement over that of the static design. By using less bits, area is reduced which will either reduce the power required by the complete design, or allow for other performance features to now be added in the space that has been vacated.

The advantages provided by an associative branch target buffer with address compression are twofold. For the number of entries presented in non-compressed BTB structure of the prior art, the same number of entries can be achieved with a fraction of the array bits and equivalent branch hazard latency while achieving nearly the same accuracy. By reducing the number of array bits, the apparatus and method described herein reduces both the dynamic and especially static power that is required by such an array. The other advantage is that for the same amount of array bits, the number of BTB entries can be significantly increased.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. Hard disk 103 and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
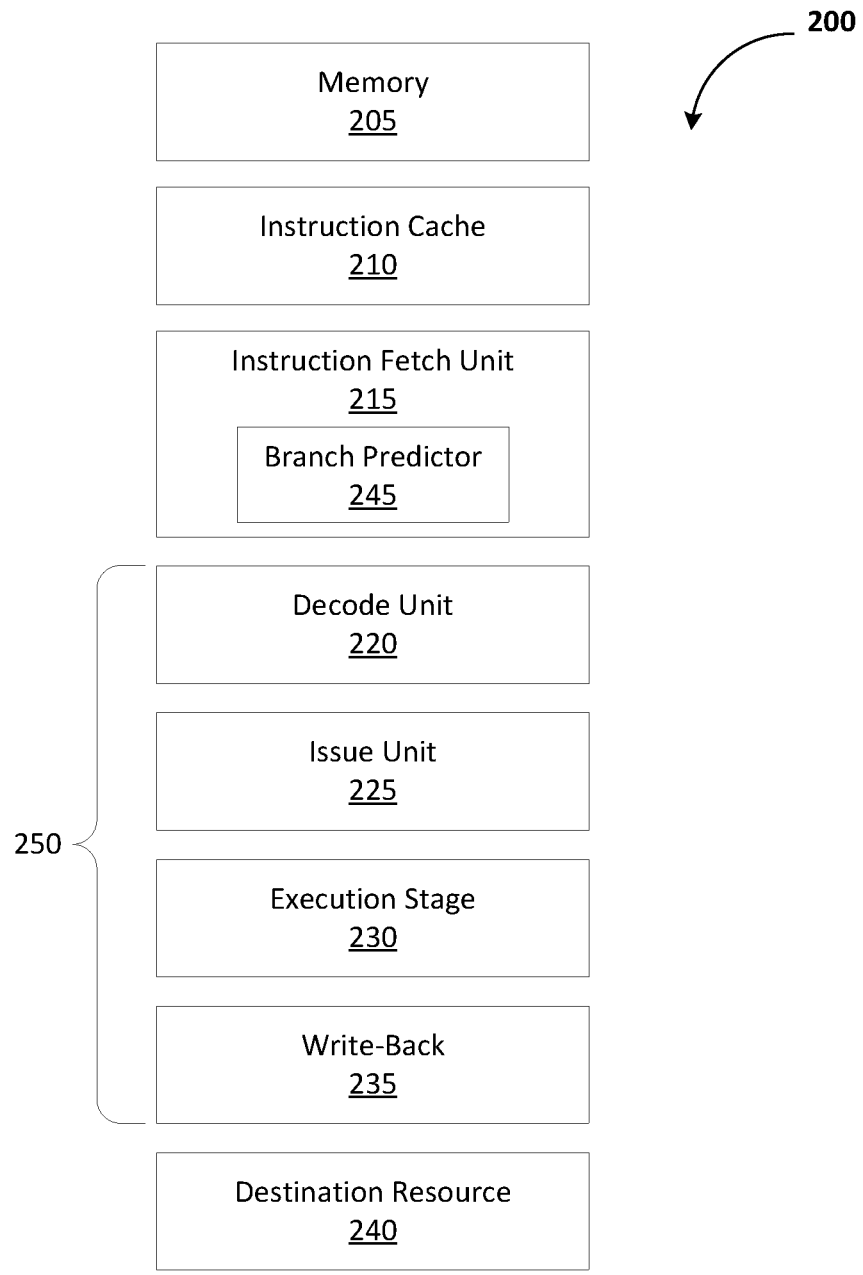
FIG. 2 is a block diagram illustrating an example of a processing system in accordance with an exemplary embodiment.

Now referring to FIG. 2, a block diagram of a processing system 200 according to an embodiment is depicted. The processing system 200 may include a memory 205, an instruction cache 210, an instruction fetch unit 215, a branch predictor 245, and a processing pipeline 250. The processing pipeline may include a decode unit 220, an issue unit 225, an execution stage 230, and/or a write-back 235. The processing system 200 may be included within a computer processor or otherwise distributed within a computer system. Instructions and data may be stored in memory 205, and the instruction cache 210 may access instructions in memory 205 and store the instructions to be fetched. The memory 205 may include any type of volatile or non-volatile memory, such as cache memory. The memory 205 and instruction cache 210 may include multiple cache levels. A data cache (not depicted) may also be included in the processing system 200.

In FIG. 2, a simplified example of the instruction fetch unit 215 and the processing pipeline 250 are depicted. The processing system 200 may further include multiple processing pipelines 250 and instruction fetch units 215. The processing pipeline 250 may include a decode unit 220, an issue unit 225, an execution stage 230, and write-back logic 235. The entire instruction fetch unit 215 or the branch predictor 245 may also be part of the processing pipeline 250. The processing pipeline 250 may include other features, such as error checking and handling logic, one or more parallel paths through the processing pipeline 250, and other features known in the art. While a forward path through the processing system 200 is depicted in FIG. 2, other feedback and signaling paths may be included between elements of the processing system 200.

The instruction fetch unit 215 may fetch instructions from the instruction cache 210 for further processing by the decode unit 220. In some embodiments, the instruction fetch unit 215 may include a branch predictor 245. Alternatively, the branch predictor 245 may be located separately from the instruction fetch unit 215. The instruction fetch unit 215 can also include other branch prediction logic (not depicted). The branch predictor 245 is an example of a processing circuit to implement asynchronous hierarchical branch prediction using a second-level branch target buffer.

The decode unit 220 may decode instructions and pass the decoded instructions, portions of instructions, or other decoded data to the issue unit 225. The issue unit 225 may analyze the instructions or other data and transmits the decoded instructions, portions of instructions, or other data to one or more execution units in the execution stage 230 based on the analysis. The execution stage 230 may execute the instructions. The execution stage 230 may include a plurality of execution units, such as fixed-point execution units, floating-point execution units, load/store execution units, and vector execution units. The write-back logic 235 may write results of instruction execution back to a destination resource 240. The destination resource 240 may be any type of resource, including registers, cache memory, other memory, I/O circuitry to communicate with other devices, other processing circuits, or any other type of destination for executed instructions or data.

Figure 3:
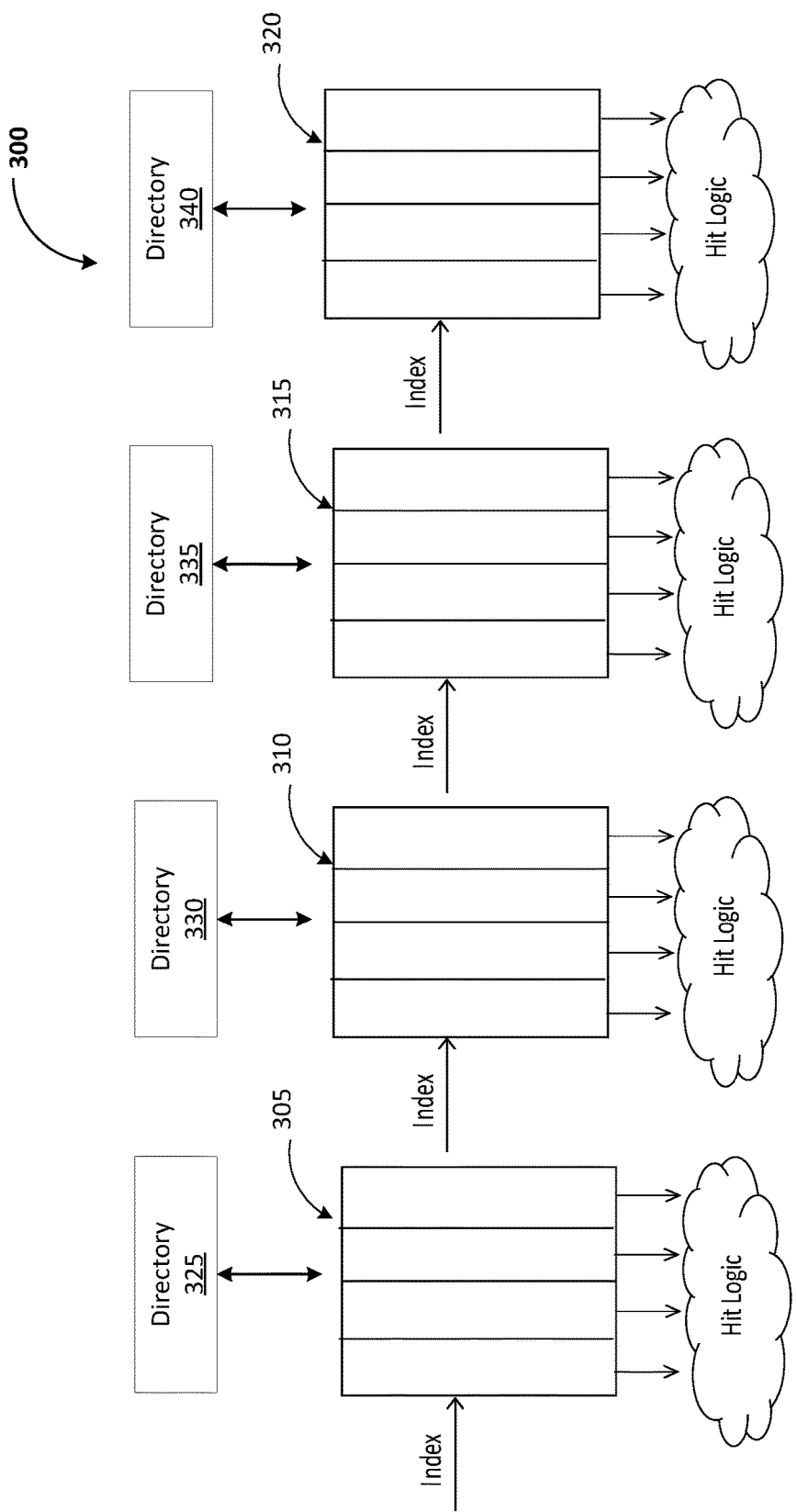
FIG. 3 is a block diagram illustrating an example architecture for variable BTB line size for compression in accordance with an exemplary embodiment.

FIG. 3 is a block diagram illustrating an example architecture 300 for variable BTB line size for compression in accordance with an exemplary embodiment. The example architecture 300 may comprise four parent arrays in the BTB (e.g., parent A 305, parent B 310, parent C 315, parent D 320. The example architecture 300 may provide increased efficiency with fast line sequential searching. In some embodiments, each parent array in the BTB may be associated with a respective directory (e.g., 325, 330, 335, 340). In some embodiments, the directory may be where the common tag bits are stored. While each parent may be 4-way associative, there may be one directory set per parent array (e.g., the same number of congruence classes in the directory as there is in the parent).

A parent array of a BTB may be indexed using part of an instruction address within the processor, and tag bits may be stored in the BTB. For example, for a 47:56 index, tag bits z:46 may be common per parent and stored in the directory and 57:63 may be unique per branch and stored with each branch.

In some embodiments, the directory may have knowledge for each parent as to if the parent is 128/64/32 line size so as to do the proper tag match. The tag match may be determined to be z:46 only or inclusive of 57 or 57:58 based on the line size (e.g., as per the example 128 byte largest line size) respectively.

The tag bits may match the remaining address bits of concern that were not used for the indexing. In order to improve the efficiency of the BTB, the BTB may be created such that it has an associativity greater than one (e.g., the parent arrays 305, 310, 315, 320 are each showing 4-ways of associativity). By creating an associativity greater than one, multiple branch/target pairs may be stored for a given index into the array. To determine which is the correct entry, if an entry at all, the tag bits are used to select one taken branch, at most, entries from the multiple entries stored for a given index.

Each parent table or array may have a single tag (e.g., obtained by methods as described herein, such as utilizing the common directory tag bits versus the offset tag bits (e.g., 57:63), where the offset tag bits are unique per branch), which may result in less bits to track four branches in a single line. Parent A 305 may have an increased line size (e.g., 128 bytes), which may likely have at least four branches, but also be likely to overflow. In response to detecting an overflow of the line in parent A 305, the line size may be reduced to half the size of the current line (e.g., 64 bytes) and use two parent tables. One parent array may store the even bytes and the other parent may store the odd 64 bytes. When there are two parents for a line, they may or may not represent the same line size. Examples are 64/64 and 32/32/64. When going from 128 byte size to a 64 byte size, the second parent array may be half the size of the original first parent array but the first parent array is also reduced in line size.

The example architecture may include increased hit logic as compared to the classical branch prediction architecture, but the hit logic is less than four times that of the classical branch prediction architecture because only four tags need to be compared with regard to the directory. When a 128-byte line is referenced, the branch predictor 245 may search 128 bytes per cycle instead of 32 bytes per cycle. Additionally, the example architecture may permit splitting of lines from 128 bytes to 64 bytes to 32 byte lines. By decreasing line size of parent arrays, more than a single cycle may be used to search through the 128-byte line.

In some embodiments, indexing to each parent array may apply a different hash (e.g., congruence class). For example, when dividing a single 128-byte parent array to four 32-byte parents, all four parent arrays of congruence class X are not all occupied, thus conflicting with another i-txt line requiring congruence class X.

When a line is split in half to a smaller size, the entries can be moved into the new parent array or they can be re-installed upon a future discovery of the given branch. In some embodiments, given BTB2 capacities, limited number of re-installs may be required.

The example architecture 300 may result in faster sequential search rate; greater efficiency on stored branches (e.g., shared tags); and/or unused entries within a parent array (e.g., for x ways: min 0, max of x−1), which may be used for other data to be stored.

Figure 4:
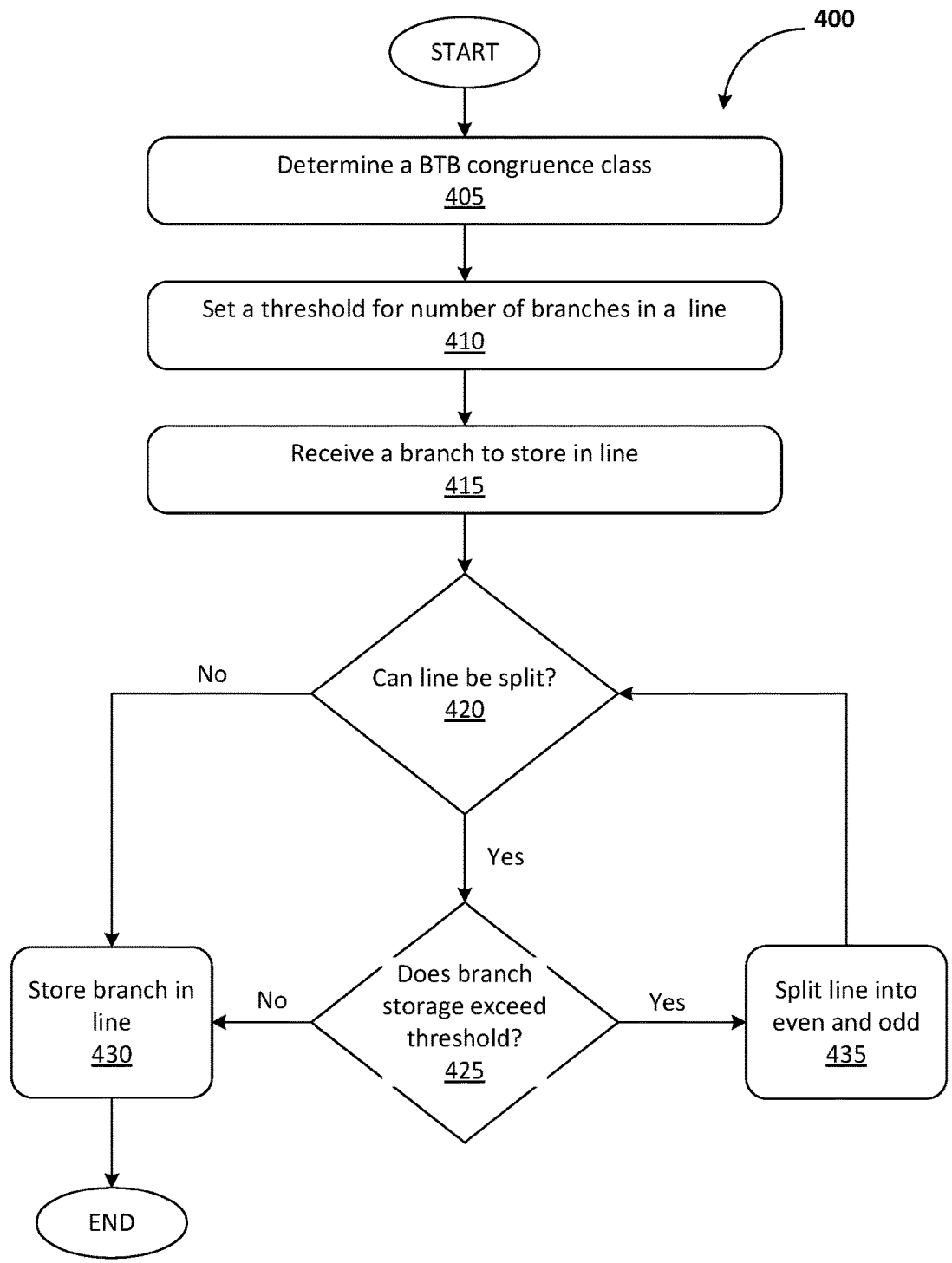
FIG. 4 is a flow diagram of a method for variable BTB line size for compression in accordance with an exemplary embodiment.

FIG. 4 is a flow diagram of a method 400 for variable BTB line size for compression in accordance with an exemplary embodiment. At block 405, a BTB congruence class may be determined. A BTB may be indexed by part of an instruction address within the processor, and tag bits may be stored in the BTB such that the tag bits must match the remaining address bits of concern that were not used for the indexing (e.g., obtained by methods as described herein, such as utilizing the common directory tag bits versus the offset tag bits (e.g., 57:63), where the offset tag bits are unique per branch). In order to improve the efficiency of the BTB, the BTB may be created such that it has an associativity greater than one. By creating an associativity greater than one, multiple branch/target pairs can be stored for a given index into the array. To determine which is the correct entry, if an entry at all, the tag bits are used to select one, at most, entries from the multiple entries stored for a given index. A branch congruence class may be defined for a line of a parent array (e.g., parent A 305). The BTB may include at least two levels of associativity based on the BTB congruence class (e.g., number of parent arrays, number of branches in a parent array's congruence class).

At block 410, a threshold for the number of branches in a line of a parent array may be set. Within the line of the parent array (e.g., parent A 305), a threshold may be specified to indicate the number of branches that may be stored (e.g., 4). In some embodiments, this may be further optimized to support more branches using known techniques and methods, such as dynamically adaptive associativity of a BTB.

At block 415, a branch may be received to store in a line of the parent array. In some embodiments, the branch predictor 245 may receive a branch to store in the BTB. The branch predictor 245 may identify the line/congruence class of the parent array based on the instruction address of the branch and the parent that the branch is being stored into.

At block 420, a determination may be made as to whether the line can be split. If it is determined the line cannot be split, the branch may replace some other branch in the parent entry per a known selection replacement process (e.g., LRU). In some embodiments, if the line cannot be split, the branch may be dropped and the method 400 may terminate.

If at block 420, it is determined that the line can be split, the method may proceed to block 425. At block 425, a determination may be made as to whether the branch storage would exceed the threshold associated with the line of the parent array. The branch predictor 245 may determine whether storage of the branch to the line of the parent array would exceed the predetermined threshold associated with the line of the parent array. If at block 425, the threshold would not be exceeded, then the method 400 may progress to block 430. At block 430, the branch may be stored in the line of the parent array and the method 400 may terminate.

If at block 425, the threshold would be exceeded, then the method may progress to block 435. At block 435, the line of the parent array may be split. In some embodiments, the line may be reduced to half the size (e.g., from 128 bytes to 64 bytes) and stored in different parent arrays. The line may be split into an odd half line and an even half line, to be stored in different parent arrays. The new branch may either fall in the even half line or the odd half line and, as such, may go to the parent that represents the associated part of the cache line.

In some embodiments, the line size of the line of the newly allocated parent array may be half the line size of the previous parent array (e.g., if line size of a line of parent A 305 is 128 bytes, the line size of a line of parent B 310 may be 64 bytes). In some embodiments, in response to splitting the line, entries from the line may be moved to the newly allocated parent array. In some embodiments, the entries may be reinstalled to the newly allocated parent array the next time the branch predictor searches a line and does not find a branch which is detected later in the pipeline (e.g. via decode, execution, or completion).

From here, the method 400 may proceed back to block 420, where another determination may be made as to whether storage of the branch in the line of the parent array would exceed a threshold associated with the block of the line. If so, block 435 may be repeated, until the branch is stored in a line of parent array.

In some embodiments, when there is a new branch install and there is not a directory match, then one of the four parents may be fully cleared out to make room for this new branch (e.g., as per a new 32:46 tag range).

In some embodiments, when a line is split, there may be a subset of branches that are "lost" and have to be reinstalled. This may be acceptable because the goal is to compress for the second level table meant to handle capacity. Through a large hierarchical capacity, few new branches may be installed.

In one example embodiment, a parent array may have a line that is 128 bytes and there are four branches in the first 32 bytes and then a fifth branch is encountered in the second 32 bytes. The 128-byte line may be split into even-even 32 bytes and even-odd 32 bytes. The remaining 64 bytes may not have a parent entry. Upon encountering a branch in the odd 64 bytes, an odd 64-byte parent may be created such that there is even-even 32 bytes, even-odd 32 bytes, and odd 64-bytes.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
    a branch target buffer (BTB); and
    a processing circuit coupled to the branch target buffer, the processing circuit configured to perform a method comprising:
        determining a BTB congruence class for a line of a first parent array of the BTB, wherein the BTB congruence class includes a hash, and
            wherein the BTB comprises at least two levels of associativity based on the BTB congruence class;
        setting a threshold indicative of a maximum number branches to be stored in the line;
        receiving a branch to store in the line of the first parent array;
        determining that storing the branch in the line would exceed the threshold; and
        splitting the line into an even half line and an odd half line responsive to determining that storing the branch in the line would exceed the threshold, wherein the branch is stored in a second parent array based on an address of a branching mapping to either the even half line or the odd half line; and
        reinstalling entries to a newly allocated parent array when a branch is detected in a pipeline, which was not found by a branch predictor upon earlier searching of the pipeline.

2. The system of claim 1, wherein the even half line and the odd half line are each stored in a different parent array.

3. The system of claim 1, wherein the second parent array has a size that is half of the first parent array.

4. The system of claim 1, wherein the processing circuit is further configured to perform:
    moving entries from the first parent array to the second parent array.

5. The system of claim 1, wherein an index into the second parent array uses a different hash than an index into the first parent array.

6. A computer-implemented method comprising:
    determining a branch target buffer (BTB) congruence class for a line of a first parent array of a BTB, wherein the BTB congruence class includes a hash, and
    wherein the BTB comprises at least two levels of associativity based on the BTB congruence class;
    setting a threshold indicative of a maximum number branches to be stored in the line;
    receiving a branch to store in the line of the first parent array;
    determining that storing the branch in the line would exceed the threshold;
    splitting the line into an even half line and an odd half line responsive to determining that storing the branch in the line would exceed the threshold, wherein the branch is stored in a second parent array based on an address of a branching mapping to either the even half line or the odd half line; and
    reinstalling entries to a newly allocated parent array when a branch is detected in a pipeline, which was not found by a branch predictor upon earlier searching of the pipeline.

7. The computer-implemented method of claim 6, wherein the even half line and the odd half line are each stored in a different parent array.

8. The computer-implemented method of claim 6, wherein the second parent array has a size that is half of the first parent array.

9. The computer-implemented method of claim 6, further comprising:
    moving entries from the first parent array to the second parent array.

10. The computer-implemented method of claim 6, wherein an index into the second parent array uses a different hash than an index into the first parent array.

11. A computer program product, the computer program product comprising:
    a tangible storage medium readable by a processing circuit and storing instructions for execution by the processing circuit for performing a method comprising:
    determining a branch target buffer (BTB) congruence class for a line of a first parent array of a BTB, wherein the BTB congruence class includes a hash, and
        wherein the BTB comprises at least two levels of associativity based on the BTB congruence class;
    setting a threshold indicative of a maximum number branches to be stored in the line;
    receiving a branch to store in the line of the first parent array;
    determining that storing the branch in the line would exceed the threshold;
    splitting the line into an even half line and an odd half line responsive to determining that storing the branch in the line would exceed the threshold, wherein the branch is stored in a second parent array based on an address of a branching mapping to either the even half line or the odd half line; and
    reinstalling entries to a newly allocated parent array when a branch is detected in a pipeline, which was not found by a branch predictor upon earlier searching of the pipeline.

12. The computer program product of claim 11, wherein the even half line and the odd half line are each stored in a different parent array.

13. The computer program product of claim 11, wherein the second parent array has a size that is half of the first parent array.

14. The computer program product of claim 11, wherein the method further comprises: moving entries from the first parent array to the second parent array.

* * * * *